United States Patent [19]

Nakamura

[11] 4,258,985
[45] Mar. 31, 1981

[54] INVERTED TELEPHOTO TYPE WIDE ANGLE LENS SYSTEM

[75] Inventor: Akiyoshi Nakamura, Sakai, Japan

[73] Assignee: Minolta Camera Kabushiki Kaisha, Osaka, Japan

[21] Appl. No.: 45,433

[22] Filed: Jun. 4, 1979

[30] Foreign Application Priority Data

Jun. 16, 1978 [JP] Japan .................................. 53-73362

[51] Int. Cl.$^3$ .............................................. G02B 13/04
[52] U.S. Cl. .................................................... 350/459
[58] Field of Search ......................................... 350/214

[56] References Cited

U.S. PATENT DOCUMENTS

| | | | |
|---|---|---|---|
| 3,473,832 | 8/1968 | Ogura | 350/214 |
| 3,862,794 | 1/1975 | Fujii | 350/214 |

*Primary Examiner*—Conrad J. Clark
*Attorney, Agent, or Firm*—Jackson, Jones & Price

[57] ABSTRACT

The inverted telephoto type wide angle lens system of the present invention includes, from the object to image side, a first lens group having a positive single lens, a first negative meniscus single lens convex to the object side and a second negative meniscus single lens convex to the object side. A second lens group includes at least one positive lens while a third lens group includes, from the object to the image side, a first positive meniscus single lens convex to the image side, a biconcave single lens, a second positive single lens convex to the image side and a positive single lens. In addition, the inverted telephoto type wide angle lens system of the present invention fulfills the following conditions:

| | | | |
|---|---|---|---|
| $0.75f <$ | $\|f_{1,2,3}\|$ | $< 1.25f$ | $f_{1,2,3} < 0$ |
| $10f <$ | $f_1$ | $< 20f$ | |
| $6.5f <$ | $\|r_2\|$ | $< 22f$ | $r_2 < 0$ |
| $1.3f <$ | $f_5$ | $< 1.9f$ | | wherein:

$f_{1,2,3}$ represents the focal length of the first lens group;
$f_1$ represents the focal length of the positive single lens in the first lens group;
$r_2$ represents the radius of curvature of the image side surface of the positive single lens in the first lens group;
$f_5$ represents the focal length of the first positive meniscus single lens in the third lens group; and
f represents the focal length of the whole lens system.

9 Claims, 16 Drawing Figures

FIG.1
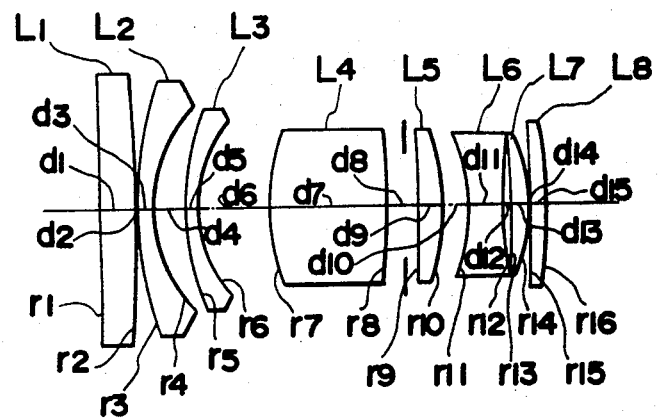
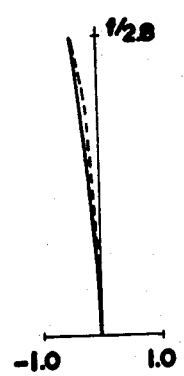
FIG.2a
Spherical Aberration
Sine Condition
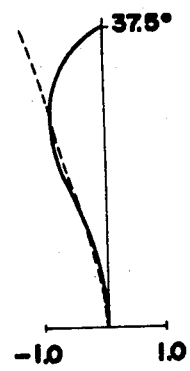
FIG.2b
Astigmatism
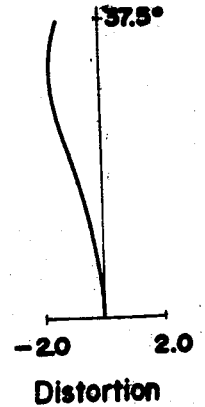
FIG.2c
Distortion Spherical Aberration
Sine Condition Astigmatism Distortion FIG.5
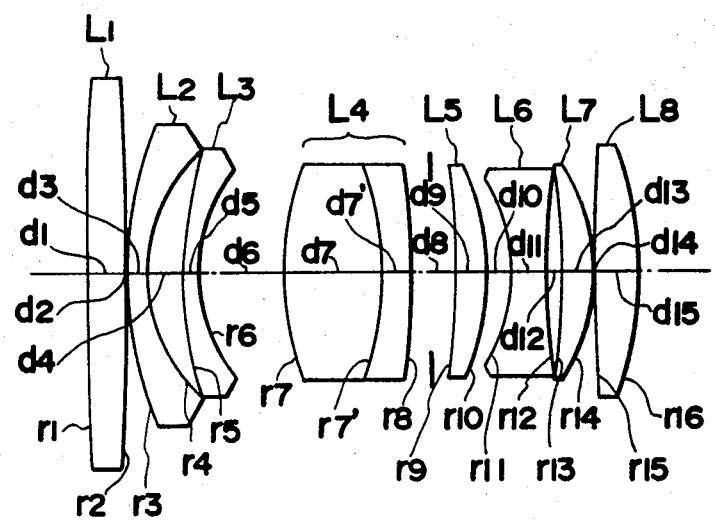
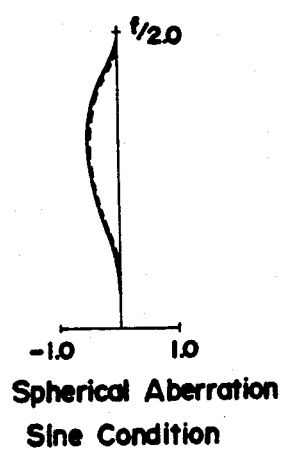
FIG.6a
Spherical Aberration
Sine Condition
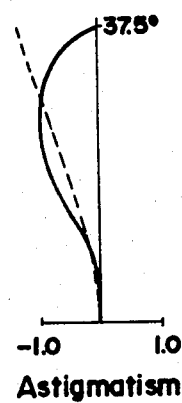
FIG.6b
Astigmatism
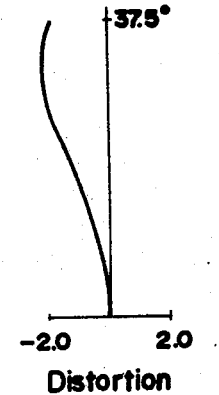
FIG.6c
Distortion Spherical Aberration
Sine Condition Astigmatism Distortion though the prior art is crowded in attempts to achieve improved optical performance, there is still a demand to provide an improved inverted telephoto type wide angle lens system.

INVERTED TELEPHOTO TYPE WIDE ANGLE LENS SYSTEM

BACKGROUND OF THE INVENTION

1. Field of the Invention

The present invention relates to an inverted telephoto type wide angle lens system having a relatively high aperture ratio of greater than 1/2.8, a relatively wide field angle reaching 75 degrees and a back focal length greater than the focal length of the lens system.

2. Description of the Prior Art

Retrofocus lens systems have been suggested in the prior art with a negative front lens group to obtain a sufficiently long back focal length. For example, a negative front lens group formed from a combination of a pair of negative single lenses and a positive single lens is suggested in U.S. Pat. No. 3,862,794.

The prior art has strived to provide an increased field angle while still maintaining a light weight compact lens structure. In attempts to achieve this compactness, it has been recommended to locate a positive single lens, preferably in the form of a positive meniscus lens convex to the object side, at the front of the lens system and to arrange a pair of negative lenses, preferably each in front of a negative meniscus lens convex to the object side, at the image side of the positive single lens. Reference is made to U.S. Pat. No. 3,973,832 to disclose such a lens system.

The competitive rigors of the camera industry has placed a constant demand on the lens designers to provide ever increasing optical performances while further compacting and making light weight lens systems. Accordingly, even though the prior art is crowded in attempts to achieve improved optical performance, there is still a demand to provide an improved inverted telephoto type wide angle lens system.

SUMMARY OF THE INVENTION

It is an object of the present invention to improve an inverted telephoto type wide angle lens system while maintaining a balanced correction of aberration.

It is another object of the present invention to provide a relatively high aperture ratio with a relatively wide field angle approximating 75° while maintaining sufficient illumination of the marginal areas of the image transmitted to the focal plane.

It is a further object of the present invention to improve such a lens system while maintaining a compactness in size.

The inverted telephoto type wide angle lens system of the present invention includes, from the object to image side, a first lens group having a positive single lens, a first negative meniscus single lens convex to the object side and a second negative meniscus single lens convex to the object side. A second lens group includes at least one positive lens while a third lens group includes, from the object to the image side, a first positive meniscus single lens convex to the image side, a biconcave single lens, a second positive meniscus single lens convex to the image side and a positive single lens. In addition, the inverted telephoto type wide angle lens system of the present invention fulfills the following conditions:

$$0.75f < \frac{|f_{1,2,3}|}{f_1} < 1.25f \qquad f_{1,2,3} < 0$$

$$10f < \frac{}{} < 20f$$

$$6.5f < \frac{|r_2|}{f_5} < 22f \qquad r_2 < 0$$

$$1.3f < \frac{}{} < 1.9f$$

wherein:

$f_{1,2,3}$ represents the focal length of the first lens group;

$f_1$ represents the focal length of the positive single lens in the first lens group;

$r_2$ represents the radius of curvature of the image side surface of the positive single lens in the first lens group;

$f_5$ represents the focal length of the first positive meniscus single lens in the third lens group; and $f$ represents the focal length of the whole lens system.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1 represents a schematic view of a first embodiment of the present invention;

FIGS. 2a, 2b and 2c represent graphic plots of the various aberrations of the first embodiment;

FIG. 5 represents a schematic view of a third embodiment of the present invention;

FIGS. 6a, 6b and 6c represent graphic plots of the various aberrations of the third emobidiment;

DESCRIPTION OF THE PREFERRED EMBODIMENTS

The following description is provided to enable any person skilled in the optical and camera field to make and use the invention and sets forth the best modes contemplated by the inventor for carrying out his invention. Various modifications, however, will remain readily apparent to those skilled in these arts since the generic principles of the present invention have been defined herein specifically to provide a relatively economical and easily manufactured inverted telephoto type wide angle lens system.

The derivation of the formulae and the relation of the lens powers set forth herein can be accomplished with the assistance of a computer. The present invention represents the parameters of a compromise balance of acceptable aberrations which can be relatively easily manufactured to provide a low cost lens system for utilization with a 35 mm SLR camera.

Figure 3:
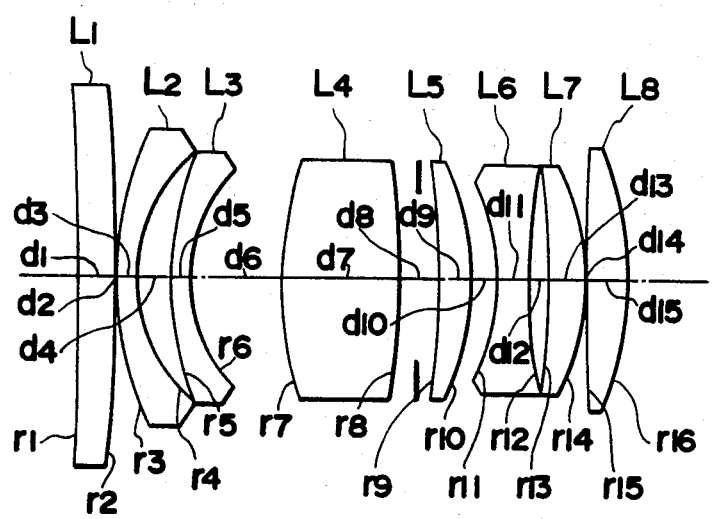
FIG. 3 represents a schematic view of a second embodiment of the present invention.
Figure 7:
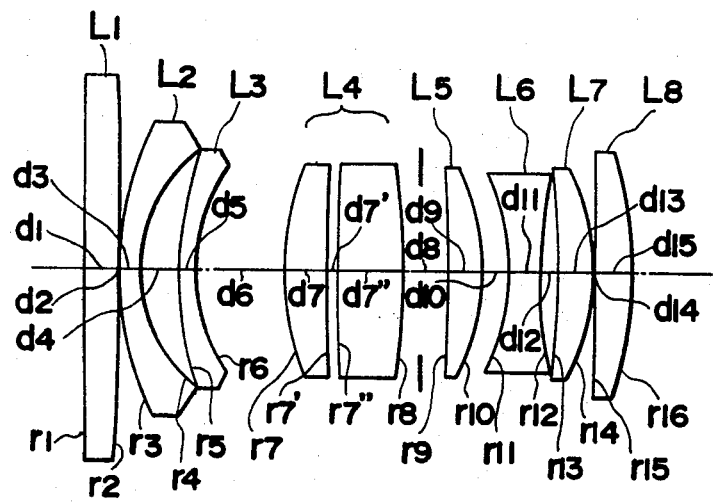
FIG. 7 represents a schematic view of a fourth embodiment of the present invention.

As can be seen in each of the embodiments of the present invention disclosed in FIGS. 1, 3, 5 and 7, an inverted telephoto type wide angle lens system having three lens groups is provided. As can be appreciated, the symbols which designate the particular lenses should be understood in the specification and claims to be interpreted broadly enough with respect to certain lens components to cover either a single lens element or an equivalent comprising a group of two or more lens elements such as a doublet.

Referring to FIG. 1, a schematic lens diagram of a first embodiment of the present invention is disclosed. While the specific dimensions of the lens systems and individual lens elements will vary in the succeeding embodiments of the present invention, the general principles of the present invention can be understood with reference to FIG. 1. It should be noted that the embodiment disclosed in FIG. 7 differs in that the second lens group will comprise two separate lens elements. Also in FIG. 5, the second lens group consists of a doublet as opposed to a single lens element.

Taking these modifications into consideration, and referring to FIG. 1, the present invention can be generally defined, from the object to image side, as a first lens group ($L_1$, $L_2$ and $L_3$) consisting of a positive single lens ($L_1$), a first negative meniscus single lens ($L_2$) convex to the object side and a second negative meniscus single lens ($L_3$) convex to the object side; a second lens group ($L_4$) including at least a positive lens ($L_4$), and a third lens group ($L_5$, $L_6$, $L_7$ and $L_8$) consisting, from the object to the image side, of a first positive meniscus single lens ($L_5$) convex to the image side, a biconcave single lens ($L_6$) and a second positive meniscus single lens ($L_7$) convex to the image side and a positive single lens ($L_8$). The lens system of the present invention fulfills the following conditions:

| (1) | $0.75f <$ | $|f_{1,2,3}|$ | $< 1.25f$, | $f_{1,2,3} < 0$ |
|---|---|---|---|---|
| (2) | $10f <$ | $f_1$ | $< 20f$ | |
| (3) | $6.5f <$ | $|r_2|$ | $< 22f$, | $r_2 < 0$ |
| (4) | $1.3f <$ | $f_5$ | $< 1.9f$ | | wherein:

$f_{1,2,3}$ represents the focal length of the first lens group ($L_1$, $L_2$ and $L_3$);

$f_1$ represents the focal length of the positive single lens ($L_1$) in the first lens group;

$r_2$ represents the radius of curvature of the image side surface ($r_2$) of the positive single lens ($L_1$) in the first lens group;

$f_5$ represents the focal length of the first positive meniscus single lens ($L_5$) in third lens group; and f represents the focal length of the whole lens system.

Above conditions (1), (2) and (3) relate to the first lens group located at the front of the lens system. According to the present invention, the front positive lens ($L_1$) is given a relatively weak positive refractive power in contrast with the prior art to lessen the negative refractive powers required of the subsequent pair of negative meniscus lenses ($L_2$ and $L_3$) for achieving a necessary negative refractive power of the first lens group ($L_1$, $L_2$, and $L_3$) as a whole. This design approach reduces the aberrations generated in the first lens group ($L_1$, $L_2$ and $L_3$). The first lens group ($L_1$, $L_2$ and $L_3$) of the present invention is further characterized by the specific shape of the front positive lens ($L_1$) to insure a sufficient illumination of the marginal area of an image in the focal plane.

Specifically, condition (1) defines the negative refractive power of the first lens group ($L_1$, $L_2$ and $L_3$). If $|f_{1,2,3}|$ is excessively reduced to violate the lower limit of condition (1), then the first lens group ($L_1$, $L_2$ and $L_3$) will have an excessive negative refractive power which increases both the negative distortion and astigmatism to a degree that they cannot be practically corrected by the remaining image side lens group ($L_4$ to $L_8$). If the upper limit of the range is violated then a desirable long back focal length of the system cannot be obtained because of insufficient negative refractive power of the first lens group ($L_1$, $L_2$ and $L_3$).

Conditions (2) and (3) define the refractive power and shape of the front lens ($L_1$). If $f_1$ is reduced below the lower limit of condition (2), the positive refractive power of the front lens ($L_1$) will be so strong that greater negative refractive powers would have to be provided to the pair of negative meniscus lenses ($L_2$ and $L_3$) to maintain the overall necessary negative refractive power of the first lens group ($L_1$, $L_2$ and $L_3$). By providing such strong refractive powers for lenses ($L_1$), ($L_2$) and ($L_3$) will inevitably result in increased distortion and astigmatism. On other other hand, an excessively great focal length $f_1$ of the positive lens ($L_1$) will violate the upper limit of condition (2) and will lose an effective ability to correct distortion.

With respect to condition (3), the positive refractive power of surface ($r_2$) will be so strong that over-corrections of lateral chromatic aberration and distortion would result if $|r_2|$ is excessively reduced to violate the lower limit of condition (3). On the contrary, if $|r_2|$ is excessively increased by violating the upper limit of condition (3), the expected use of surface ($r_2$) to correct distortion will not be effective. Additionally, in case that $|r_2|$ is excessively increased, the illumination of the marginal area of the focal plane would be insufficient since the radius of curvature of the front surface ($r_1$) should be positive and inevitably for maintaining the necessary positive refractive power of the lens ($L_1$) required by condition (2). In practice, the combination of conditions (2) and (3) implies that the absolute value for the object side surface ($r_1$) should be greater than that of the image side surface ($r_2$) in the front positive lens ($L_1$).

Condition (4) insures that the positive refractive power of the first positive meniscus lens ($L_5$), which is located next to the aperture stop at the image side thereof, should be relatively great in contrast with the prior art. Lens ($L_5$) is expected to effectively correct spherical aberration and coma, which are principle problems tht occur with an increase in the aperture ratio of the lens system. If $f_5$ is excessively reduced to violate the lower limit of condition (4), an under-correction of spherical aberration and a negatively deviated field curvature result. On the other hand, if $f_5$ is excessively increased to violate the upper limit of condition (4), the correction of coma is difficult unless the total length of the system is increased which is at variance with the design objective of compactness.

Figure 4A:
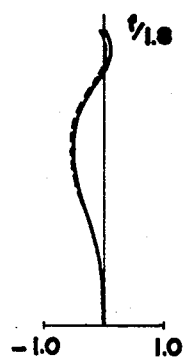
FIGS. 4a, 4b and 4c represent graphic plots of the various aberrations of the second embodiment.
Figure 4B:
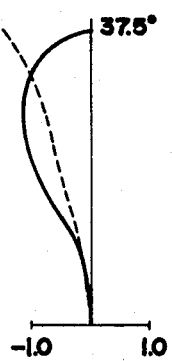
Figure 4C:
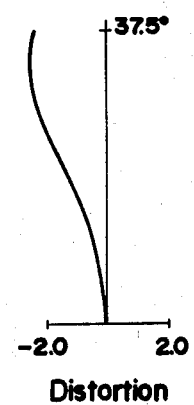
Figure 8A:
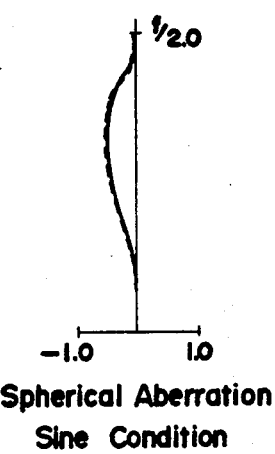
FIGS. 8a, 8b and 8c represent graphic plots of the various aberrations of the fourth embodiment.
Figure 8B:
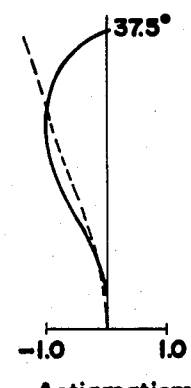
Figure 8C:
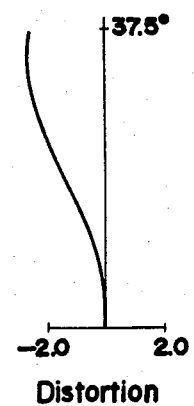

The following Tables 1 to 4 show four separate embodiments of the present invention, respectively, wherein FIGS. 1 and 2a, 2b and 2c relate to Table 1; FIGS. 3 and 4a, 4b and 4c relate to Table 2; FIGS. 5 and 6a, 6b and 6c relate to Table 3 and FIGS. 7 and 8a, 8b, and 8c relate to Table 4.

In each Table, f equals the focal length, $2\omega$ equals the field angle, r is the radius of curvature with respective subnumbers indicating the surfaces from the object to image side along the optical axis, d represents the axial distance and includes both the airspaces and the actual thicknesses of the lens components along the optical axis. N equals the refractive index and again the subnumbers refer to the particular optical element from the object to image side and finally, $\nu$, equals the Abbe number and the subnumbers refer to the specific lens elements from the object to image side.

TABLE 1

(Embodiment 1)

$f = 100 \ F_{No.} = 2.8 \ 2\omega = 75°$

| Radius of Curvature | Axial Distance | Refractive Index | Abbe Number |
|---|---|---|---|
| $r_1$ −4488.98 | | | |
| | $d_1$ 13.50 | $N_1$ 1.6935 | $\nu_1$ 53.61 |
| $r_2$ −759.55 | | | |
| | $d_2$ 0.42 | | |
| $r_3$ 132.45 | | | |
| | $d_3$ 4.00 | $N_2$ 1.5213 | $\nu_2$ 51.19 |
| $r_4$ 48.88 | | | |
| | $d_4$ 12.00 | | |
| $r_5$ 101.16 | | | |
| | $d_5$ 4.00 | $N_3$ 1.5182 | $\nu_3$ 59.11 |
| $r_6$ 46.60 | | | |
| | $d_6$ 23.22 | | |
| $r_7$ 86.11 | | | |
| | $d_7$ 40.00 | $N_4$ 1.7620 | $\nu_4$ 40.33 |
| $r_8$ −309.71 | | | |
| | $d_8$ 10.97 | | |
| $r_9$ −333.34 | | | |
| | $d_9$ 7.00 | $N_5$ 1.7495 | $\nu_5$ 50.41 |
| $r_{10}$ −93.53 | | | |
| | $d_{10}$ 8.60 | | |
| $r_{11}$ −78.73 | | | |
| | $d_{11}$ 10.65 | $N_6$ 1.8052 | $\nu_6$ 25.21 |
| $r_{12}$ 166.05 | | | |
| | $d_{12}$ 3.50 | | |
| $r_{13}$ −230.47 | | | |
| | $d_{13}$ 6.50 | $N_7$ 1.7725 | $\nu_7$ 50.14 |
| $r_{14}$ −61.73 | | | |
| | $d_{14}$ 0.42 | | |
| $r_{15}$ 1940.20 | | | |
| | $d_{15}$ 5.40 | $N_8$ 1.6935 | $\nu_8$ 50.47 |
| $r_{16}$ −168.51 | | | |

TABLE 2

(Embodiment 2)

$f = 100 \ F_{No.} = 1.8 \ 2\omega = 75°$

| Radius of Curvature | Axial Distance | Refractive Index | Abbe Number |
|---|---|---|---|
| $r_1$ −1603.62 | | | |
| | $d_1$ 13.50 | $N_1$ 1.6935 | $\nu_1$ 53.61 |
| $r_2$ −702.33 | | | |
| | $d_2$ 0.52 | | |
| $r_3$ 104.85 | | | |
| | $d_3$ 6.00 | $N_2$ 1.5168 | $\nu_2$ 64.22 |
| $r_4$ 54.70 | | | |
| | $d_4$ 12.00 | | |
| $r_5$ 102.95 | | | |
| | $d_5$ 6.00 | $N_3$ 1.5168 | $\nu_3$ 64.22 |
| $r_6$ 51.73 | | | |
| | $d_6$ 30.72 | | |
| $r_7$ 128.36 | | | |
| | $d_7$ 40.00 | $N_4$ 1.8061 | $\nu_4$ 40.83 |
| $r_8$ −297.73 | | | |
| | $d_8$ 14.50 | | |
| $r_9$ −233.61 | | | |
| | $d_9$ 10.97 | $N_5$ 1.7725 | $\nu_5$ 50.14 |
| $r_{10}$ −84.12 | | | |
| | $d_{10}$ 8.60 | | |
| $r_{11}$ −79.66 | | | |
| | $d_{11}$ 10.65 | $N_6$ 1.8052 | $\nu_6$ 25.21 |
| $r_{12}$ 191.70 | | | |
| | $d_{12}$ 7.00 | | |
| $r_{13}$ −291.20 | | | |
| | $d_{13}$ 12.00 | $N_7$ 1.7725 | $\nu_7$ 50.14 |
| $r_{14}$ −85.05 | | | |
| | $d_{14}$ 0.52 | | |
| $r_{15}$ 1349.13 | | | |
| | $d_{15}$ 13.04 | $N_8$ 1.6968 | $\nu_8$ 55.80 |
| $r_{16}$ −121.66 | | | |

TABLE 3

(Embodiment 3)

$f = 100 \ F_{No.} = 2.0 \ 2\omega = 75°$

| Radius of Curvature | Axial Distance | Refractive Index | Abbe Number |
|---|---|---|---|
| $r_1$ 2134.43 | | | |
| | $d_1$ 13.50 | $N_1$ 1.6935 | $\nu_1$ 53.61 |
| $r_2$ −2066.01 | | | |
| | $d_2$ 0.52 | | |
| $r_3$ 131.97 | | | |
| | $d_3$ 6.00 | $N_2$ 1.5168 | $\nu_2$ 64.22 |
| $r_4$ 56.00 | | | |
| | $d_4$ 12.00 | | |
| $r_5$ 121.73 | | | |
| | $d_5$ 6.00 | $N_3$ 1.5168 | $\nu_3$ 64.22 |
| $r_6$ 53.51 | | | |
| | $d_6$ 30.72 | | |
| $r_7$ 98.13 | | | |
| | $d_7$ 31.77 | $N_4$ 1.6975 | $\nu_4$ 48.32 |
| $r_{7'}$ −110.52 | | | |
| | $d_{7'}$ 9.41 | $N_{4'}$ 1.5176 | $\nu_{4'}$ 53.59 |
| $r_8$ −338.65 | | | |
| | $d_8$ 14.50 | | |
| $r_9$ −315.46 | | | |
| | $d_9$ 10.97 | $N_5$ 1.6676 | $\nu_5$ 41.90 |
| $r_{10}$ −84.17 | | | |
| | $d_{10}$ 8.60 | | |
| $r_{11}$ −65.53 | | | |
| | $d_{11}$ 10.65 | $N_6$ 1.8052 | $\nu_6$ 25.21 |
| $r_{12}$ 228.02 | | | |
| | $d_{12}$ 5.30 | | |
| $r_{13}$ −261.01 | | | |
| | $d_{13}$ 11.00 | $N_7$ 1.7570 | $\nu_7$ 48.04 |
| $r_{14}$ −71.10 | | | |
| | $d_{14}$ 0.52 | | |
| $r_{15}$ 1231.72 | | | |
| | $d_{15}$ 13.00 | $N_8$ 1.7050 | $\nu_8$ 55.30 |
| $r_{16}$ −139.66 | | | |

TABLE 4

(Embodiment 4)

$f = 100 \ F_{No.} = 2.0 \ 2\omega = 75°$

| Radius of Curvature | Axial Distance | Refractive Index | Abbe Number |
|---|---|---|---|
| $r_1$ 7518.80 | | | |
| | $d_1$ 13.50 | $N_1$ 1.6935 | $\nu_1$ 53.61 |
| $r_2$ −1494.77 | | | |
| | $d_2$ 0.52 | | |
| $r_3$ 117.92 | | | |
| | $d_3$ 6.00 | $N_2$ 1.511 | $\nu_2$ 60.49 |
| $r_4$ 54.21 | | | |
| | $d_4$ 12.00 | | |
| $r_5$ 115.00 | | | |
| | $d_5$ 6.00 | $N_3$ 1.5111 | $\nu_3$ 60.49 |
| $r_6$ 52.66 | | | |
| | $d_6$ 30.72 | | |
| $r_7$ 112.26 | | | |
| | $d_7$ 14.00 | $N_4$ 1.7620 | $\nu_2$ 40.38 |
| $r_{7'}$ 694.93 | | | |
| | $d_{7'}$ 4.00 | | |
| $r_{7''}$ 1254.71 | | | |
| | $d_{7''}$ 22.00 | $N_{4'}$ 1.7620 | $\nu_{4'}$ 40.38 |
| $r_8$ −217.30 | | | |
| | $d_8$ 14.50 | | |
| $r_9$ −427.72 | | | |
| | $d_9$ 10.97 | $N_5$ 1.7495 | $\nu_5$ 50.41 |
| $r_{10}$ −89.36 | | | |
| | $d_{10}$ 8.60 | | |
| $r_{11}$ −74.06 | | | |
| | $d_{11}$ 10.65 | $N_6$ 1.8052 | $\nu_6$ 25.21 |
| $r_{12}$ 192.94 | | | |
| | $d_{12}$ 7.00 | | |
| $r_{13}$ −233.15 | | | |
| | $d_{13}$ 11.50 | $N_7$ 1.7725 | $\nu_7$ 50.14 |
| $r_{14}$ −75.97 | | | |
| | $d_{14}$ 0.52 | | |
| $r_{15}$ 1956.95 | | | |
| | $d_{15}$ 12.50 | $N_8$ 1.6968 | $\nu_8$ 55.80 |

TABLE 4-continued (Embodiment 4)

| | f = 100 F$_{No.}$ = 2.0 2ω = 75° | | |
|---|---|---|---|
| Radius of Curvature | Axial Distance | Refractive Index | Abbe Number |
| r$_{16}$  −141.52 | | | |

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by the specific enclosed embodiments but only by the scope and spirit of the appended claims.

What is claimed is:

1. An inverted telephoto type wide angle lens system comprising, from the object to image side:
   a first lens group consisting, from the object to the image side, of a positive single lens, a first negative meniscus single lens convex to the object side and a second negative meniscus single lens convex to the object side;
   a second lens group including at least a positive lens, and
   a third lens group consisting, from the object to the image side, of a first positive meniscus single lens convex to the image side, a biconcave single lens, a second positive meniscus single lens convex to the image side and a positive single lens, in which the lens system fulfills the following conditions:

| 0.75f < | \|f$_{1,2,3}$\| | < 1.25f | f$_{1,2,3}$ < 0 |
|---|---|---|---|
| 10f < | f$_1$ | < 20f | |
| 6.5f < | \|r$_2$\| | < 22f | r$_2$ < 0 |
| 1.3f < | f$_5$ | < 1.9f | | wherein:
   f$_{1, 2, 3}$ represents the focal length of the first lens group;
   f$_1$ represents the focal length of the positive single lens in the first lens group;
   r$_2$ represents the radius of curvature of the image side-surface of the positive single lens in the first lens group;
   f$_5$ represents the focal length of the first positive meniscus single lens in the third lens group; and
   f represents the focal length of the whole lens system.

2. The invention of claim 1, wherein the second lens group consists of a positive single lens.

3. The invention of claim 1, wherein the second lens group consists of a positive doublet.

4. The invention of claim 1, wherein the second lens group consists of a pair of separate single lenses which have a positive refractive power as a whole.

5. An inverted telephoto type wide angle lens system comprising, from the object to image side:
   a first lens group consisting, from the object to the image side, of a positive single lens, a first negative meniscus single lens convex to the object side and a second negative meniscus single lens convex to the object side, the absolute value of the radius of curvature of the object side surface of the positive single lens being greater than that of the image side surface of the positive single lens;
   a second lens group including at least a positive lens, and
   a third lens group consisting, from the object to the image side, of a first positive meniscus single lens convex to the image side, a biconcave single lens, a second positive meniscus single lens convex to the image side and a positive single lens.

6. A compact inverted telephoto wide angle lens system comprising the following design parameters:

| | f = 100 f$_{No.}$ = 1.8 2ω = 75° | | | | | |
|---|---|---|---|---|---|---|
| Radius of Curvature | Axial Distance | | Refractive Index | | Number | |
| r$_1$  −4488.98 | | | | | | |
| | d$_1$ | 13.50 | N$_1$ | 1.6935 | ν$_1$ | 53.61 |
| r$_2$  −759.55 | | | | | | |
| | d$_2$ | 0.42 | | | | |
| r$_3$  132.45 | | | | | | |
| | d$_3$ | 4.00 | N$_2$ | 1.5213 | ν$_2$ | 51.19 |
| r$_4$  48.88 | | | | | | |
| | d$_4$ | 12.00 | | | | |
| r$_5$  101.16 | | | | | | |
| | d$_5$ | 4.00 | N$_3$ | 1.5182 | ν$_3$ | 59.11 |
| r$_6$  46.60 | | | | | | |
| | d$_6$ | 23.22 | | | | |
| r$_7$  86.11 | | | | | | |
| | d$_7$ | 40.00 | N$_4$ | 1.7620 | ν$_4$ | 40.38 |
| r$_8$  −309.71 | | | | | | |
| | d$_8$ | 10.97 | | | | |
| r$_9$  −333.34 | | | | | | |
| | d$_9$ | 7.00 | N$_5$ | 1.7495 | ν$_5$ | 50.41 |
| r$_{10}$  −93.53 | | | | | | |
| | d$_{10}$ | 8.60 | | | | |
| r$_{11}$  −78.73 | | | | | | |
| | d$_{11}$ | 10.65 | N$_6$ | 1.8052 | ν$_6$ | 25.21 |
| r$_{12}$  166.05 | | | | | | |
| | d$_{12}$ | 3.50 | | | | |
| r$_{13}$  −230.47 | | | | | | |
| | d$_{13}$ | 6.50 | N$_7$ | 1.7725 | ν$_7$ | 50.14 |
| r$_{14}$  −61.73 | | | | | | |
| | d$_{14}$ | 0.42 | | | | |
| r$_{15}$  1940.20 | | | | | | |
| | d$_{15}$ | 5.40 | N$_8$ | 1.6935 | ν$_8$ | 50.47 |
| r$_{16}$  −168.51 | | | | | | |

7. A compact inverted telephoto wide angle lens system comprising the following design parameters:

| | f = 100 f$_{No.}$ = 1.8 2ω = 75° | | | | | |
|---|---|---|---|---|---|---|
| Radius of Curvature | Axial Distance | | Refractive Index | | Abbe Number | |
| r$_1$  −1603.62 | | | | | | |
| | d$_1$ | 13.50 | N$_1$ | 1.6935 | ν$_1$ | 53.61 |
| r$_2$  −702.33 | | | | | | |
| | d$_2$ | 0.52 | | | | |
| r$_3$  104.85 | | | | | | |
| | d$_3$ | 6.00 | N$_2$ | 1.5168 | ν$_2$ | 64.22 |
| r$_4$  54.70 | | | | | | |
| | d$_4$ | 12.00 | | | | |
| r$_5$  102.95 | | | | | | |
| | d$_5$ | 6.00 | N$_3$ | 1.5168 | ν$_3$ | 64.22 |
| r$_6$  51.73 | | | | | | |
| | d$_6$ | 30.72 | | | | |
| r$_7$  128.36 | | | | | | |
| | d$_7$ | 40.00 | N$_4$ | 1.8061 | ν$_4$ | 40.83 |
| r$_8$  −297.73 | | | | | | |
| | d$_8$ | 14.50 | | | | |
| r$_9$  −233.61 | | | | | | |
| | d$_9$ | 10.97 | N$_5$ | 1.7725 | ν$_5$ | 50.14 |
| r$_{10}$  −84.12 | | | | | | |
| | d$_{10}$ | 8.60 | | | | |
| r$_{11}$  −79.66 | | | | | | |
| | d$_{11}$ | 10.65 | N$_6$ | 1.8052 | ν$_6$ | 25.21 |
| r$_{12}$  191.70 | | | | | | |
| | d$_{12}$ | 7.00 | | | | |
| r$_{13}$  −291.20 | | | | | | |
| | d$_{13}$ | 12.00 | N$_7$ | 1.7725 | ν$_7$ | 50.14 |

|  | -continued | | | | | |
|---|---|---|---|---|---|---|
| | $f = 100\ f_{No.} = 1.8\ 2\omega = 75°$ | | | | | |
| Radius of Curvature | Axial Distance | | Refractive Index | | Abbe Number | |
| $r_{14}$ −85.05 | | | | | | |
| | $d_{14}$ | 0.52 | | | | |
| $r_{15}$ 1349.13 | | | | | | |
| | $d_{15}$ | 13.04 | $N_8$ | 1.6968 | $\nu_8$ | 55.80 |
| $r_{16}$ −121.66 | | | | | | |

8. A compact inverted telephoto wide angle lens system comprising the following design parameters:

|  | $f = 100\ F_{No.} = 2.0\ 2\omega = 75°$ | | | | | |
|---|---|---|---|---|---|---|
| Radius of Curvature | Axial Distance | | Refractive Index | | Abbe Number | |
| $r_1$ 2134.43 | | | | | | |
| | $d_1$ | 13.50 | $N_1$ | 1.6935 | $\nu_1$ | 53.61 |
| $r_2$ −2066.01 | | | | | | |
| | $d_2$ | 0.52 | | | | |
| $r_3$ 131.97 | | | | | | |
| | $d_3$ | 6.00 | $N_2$ | 1.5168 | $\nu_2$ | 64.22 |
| $r_4$ 56.00 | | | | | | |
| | $d_4$ | 12.00 | | | | |
| $r_5$ 121.73 | | | | | | |
| | $d_5$ | 6.00 | $N_3$ | 1.5168 | $\nu_3$ | 64.22 |
| $r_6$ 53.51 | | | | | | |
| | $d_6$ | 30.72 | | | | |
| $r_7$ 98.13 | | | | | | |
| | $d_7$ | 31.77 | $N_4$ | 1.6975 | $\nu_4$ | 48.32 |
| $r_{7'}$ −110.52 | | | | | | |
| | $d_{7'}$ | 9.41 | $N_{4'}$ | 1.5176 | $\nu_{4'}$ | 53.59 |
| $r_8$ −−338.65 | | | | | | |
| | $d_8$ | 14.50 | | | | |
| $r_9$ −315.46 | | | | | | |
| | $d_9$ | 10.97 | $N_5$ | 1.6676 | $\nu_5$ | 41.90 |
| $r_{10}$ −84.17 | | | | | | |
| | $d_{10}$ | 8.60 | | | | |
| $r_{11}$ −65.53 | | | | | | |
| | $d_{11}$ | 10.65 | $N_6$ | 1.8052 | $\nu_6$ | 25.21 |
| $r_{12}$ 228.02 | | | | | | |
| | $d_{12}$ | 5.30 | | | | |
| $r_{13}$ −261.01 | | | | | | |
| | $d_{13}$ | 11.00 | $N_7$ | 1.7570 | $\nu_7$ | 48.04 |
| $r_{14}$ −71.10 | | | | | | |

|  | -continued | | | | | |
|---|---|---|---|---|---|---|
| | $f = 100\ F_{No.} = 2.0\ 2\omega = 75°$ | | | | | |
| Radius of Curvature | Axial Distance | | Refractive Index | | Abbe Number | |
| | $d_{14}$ | 0.52 | | | | |
| $r_{15}$ 1231.72 | | | | | | |
| | $d_{15}$ | 13.00 | $N_8$ | 1.7050 | $\nu_8$ | 55.30 |
| $r_{16}$ −139.66 | | | | | | |

9. A compact inverted telephoto wide angle lens system comprising the following design parameters:

|  | $f = 100\ F_{No.} = 2.0\ 2\omega = 75°$ | | | | | |
|---|---|---|---|---|---|---|
| Radius of Curvature | Axial Distance | | Refractive Index | | Abbe Number | |
| $r_1$ 7518.80 | | | | | | |
| | $d_1$ | 13.50 | $N_1$ | 1.6935 | $\nu_1$ | 53.61 |
| $r_2$ −1494.77 | | | | | | |
| | $d_2$ | 0.52 | | | | |
| $r_3$ 117.92 | | | | | | |
| | $d_3$ | 6.00 | $N_2$ | 1.5111 | $\nu_2$ | 60.49 |
| $r_4$ 54.21 | | | | | | |
| | $d_4$ | 12.00 | | | | |
| $r_5$ 115.00 | | | | | | |
| | $d_5$ | 6.00 | $N_3$ | 1.5111 | $\nu_3$ | 60.49 |
| $r_6$ 52.66 | | | | | | |
| | $d_6$ | 30.72 | | | | |
| $r_7$ 112.26 | | | | | | |
| | $d_7$ | 14.00 | $N_4$ | 1.7620 | $\nu_4$ | 40.38 |
| $r_{7'}$ 694.93 | | | | | | |
| | $d_{7'}$ | 4.00 | | | | |
| $r_{7''}$ 1254.71 | | | | | | |
| | $d_{7''}$ | 22.00 | $N_{4'}$ | 1.7620 | $\nu_{4'}$ | 40.38 |
| $r_8$ −217.30 | | | | | | |
| | $d_8$ | 14.50 | | | | |
| $r_9$ −427.72 | | | | | | |
| | $d_9$ | 10.97 | $N_5$ | 1.7495 | $\nu_5$ | 50.41 |
| $r_{10}$ −89.36 | | | | | | |
| | $d_{10}$ | 8.60 | | | | |
| $r_{11}$ −74.06 | | | | | | |
| | $d_{11}$ | 10.65 | $N_6$ | 1.8052 | $\nu_6$ | 25.21 |
| $r_{12}$ 192.94 | | | | | | |
| | $d_{12}$ | 7.00 | | | | |
| $r_{13}$ −233.15 | | | | | | |
| | $d_{13}$ | 11.50 | $N_7$ | 1.7725 | $\nu_7$ | 50.14 |
| $r_{14}$ −75.97 | | | | | | |
| | $d_{14}$ | 0.52 | | | | |
| $r_{15}$ 1956.95 | | | | | | |
| | $d_{15}$ | 12.50 | $N_8$ | 1.6968 | $\nu_8$ | 55.80 |
| $r_{16}$ −141.52 | | | | | | |

* * * * *

UNITED STATES PATENT AND TRADEMARK OFFICE
CERTIFICATE OF CORRECTION

PATENT NO. : 4,258,985

DATED : March 31, 1981

INVENTOR(S) : Akiyoshi Nakamura

It is certified that error appears in the above—identified patent and that said Letters Patent is hereby corrected as shown below:

Column 5, Table 1, under Abbe Number column, delete "40.33" and insert --40.38--.

Column 6, Table 3, under Abbe Number column, delete "$\Xi$" and insert --$\nu_7$--.

Claim 8, line 35, delete "--338.---" and insert -- -338.65 --.
                                   65

Signed and Sealed this

Eleventh Day of August 1981

[SEAL]

Attest:

GERALD J. MOSSINGHOFF

Attesting Officer   Commissioner of Patents and Trademarks